US011933659B2

(12) United States Patent
Kiendl (10) Patent No.: US 11,933,659 B2
(45) Date of Patent: Mar. 19, 2024

(54) METHOD AND APPARATUS FOR LOAD IDENTIFYING THE LOAD OF A TRANSPORT ELEMENT OF LONG-STATOR LINEAR MOTOR SYSTEM

(71) Applicant: KRONES AG, Neutraubling (DE)

(72) Inventor: Thomas Kiendl, Maxhuette-Haidhof (DE)

(73) Assignee: KRONES AG, Neutraubling (DE)

( * ) Notice: Subject to any disclaimer, the term of this patent is extended or adjusted under 35 U.S.C. 154(b) by 509 days.

(21) Appl. No.: 17/252,694

(22) PCT Filed: Feb. 25, 2019

(86) PCT No.: PCT/EP2019/054515
§ 371 (c)(1),
(2) Date: Dec. 15, 2020

(87) PCT Pub. No.: WO2019/238277
PCT Pub. Date: Dec. 19, 2019

(65) Prior Publication Data
US 2021/0116292 A1 Apr. 22, 2021

(30) Foreign Application Priority Data
Jun. 15, 2018 (DE) ...................... 10 2018 209 725.9

(51) Int. Cl.
*G01G 19/08* (2006.01)
*B60L 13/10* (2006.01)
(Continued)

(52) U.S. Cl.
CPC ........... *G01G 19/086* (2013.01); *B65G 54/02* (2013.01); *G01G 17/04* (2013.01); *G01G 19/414* (2013.01);
(Continued)

(58) Field of Classification Search
CPC .......... G01G 7/00–7/045; G01G 5/006; G01G 11/04; G01G 9/00; G01G 23/32;
(Continued)

(56) References Cited

U.S. PATENT DOCUMENTS 4,624,617 A * 11/1986 Belna .................... F16C 32/044
104/282
4,802,541 A * 2/1989 Bator ........................ G01G 7/04
177/189

(Continued)

FOREIGN PATENT DOCUMENTS

AT 518734 B1 5/2018
DE 3544201 A1 6/1986
(Continued)

OTHER PUBLICATIONS

Schröder, D., "Intelligente Verfahen," Springer-Verlag Berlin Heidelberg, New York City, New York, 2010, 6 pages.
(Continued)

*Primary Examiner* — Randy W Gibson
(74) *Attorney, Agent, or Firm* — McCoy Russell LLP (57) ABSTRACT

The present invention provides a method for identifying a load and/or wear of a transport element of a transport system with a long-stator linear motor, comprising the steps of: exciting a dynamic system consisting of the long-stator linear motor (160) and the transport element according to at least one excitation pattern; detecting the movement profile of the transport element on the basis of the at least one excitation pattern; and detecting a temporal course of a load current and/or of a load voltage of the long-stator linear motor according to the at least one excitation pattern by means of an integrated measuring device of the long-stator linear motor; wherein a loading condition of the transport element is determined depending on the detected movement (Continued)

profile and the detected temporal course of the load current and/or of the load voltage.

20 Claims, 2 Drawing Sheets

(51) Int. Cl.
| | |
|---|---|
| *B60L 15/00* | (2006.01) |
| *B65G 54/02* | (2006.01) |
| *G01G 17/04* | (2006.01) |
| *G01G 19/414* | (2006.01) |
| *G01G 19/52* | (2006.01) |
| *G01M 13/04* | (2019.01) |
| *H02K 41/03* | (2006.01) |

(52) U.S. Cl.
CPC ............ *G01G 19/52* (2013.01); *G01M 13/04* (2013.01); *B60L 13/10* (2013.01); *B60L 15/005* (2013.01); *H02K 41/031* (2013.01)

(58) Field of Classification Search
CPC .... G01G 19/086; G01G 17/04; G01G 19/414; G01G 19/52; B65G 54/02; B65G 2203/0258; G01M 13/04; B60L 13/10; B60L 15/005; H02K 11/30; H02K 41/02; H02K 4/03; H02K 41/031; H02K 41/03
See application file for complete search history.

(56) References Cited

U.S. PATENT DOCUMENTS

| | | | | |
|---|---|---|---|---|
| 6,630,633 | B1* | 10/2003 | Uber | G01G 5/006 |
| | | | | 209/639 |
| 7,020,577 | B2* | 3/2006 | Wilby | H01L 22/12 |
| | | | | 257/E21.531 |
| 8,357,548 | B2* | 1/2013 | Wilby | H01L 22/12 |
| | | | | 702/170 |
| 10,336,476 | B2* | 7/2019 | Aichinger | B67C 3/007 |
| 10,554,111 | B2* | 2/2020 | Weber | H02K 41/031 |
| 2017/0346380 | A1 | 11/2017 | Weber et al. | |
| 2020/0056928 | A1* | 2/2020 | Landrum | G01G 11/04 |

FOREIGN PATENT DOCUMENTS

| | | |
|---|---|---|
| DE | 102014104375 A1 | 10/2015 |
| WO | 2015144379 A1 | 10/2015 |
| WO | 2018208658 A1 | 11/2018 |

OTHER PUBLICATIONS

ISA European Patent Office, International Search Report Issued in Application No. PCT/EP2019/054515, dated May 17, 2019, WIPO, 4 pages.

* cited by examiner

METHOD AND APPARATUS FOR LOAD IDENTIFYING THE LOAD OF A TRANSPORT ELEMENT OF LONG-STATOR LINEAR MOTOR SYSTEM

CROSS REFERENCE TO RELATED APPLICATIONS

The present application is a U.S. National Phase of International Application No. PCT/EP2019/054515 entitled "METHOD AND APPARATUS FOR IDENTIFYING THE LOAD OF A TRANSPORT ELEMENT OF A LONG-STATOR LINEAR MOTOR SYSTEM," and filed on Feb. 25, 2019. International Application No. PCT/EP2019/054515 claims priority to German Patent Application No. 10 2018 209 725.9 filed on Jun. 15, 2018. The entire contents of each of the above-listed applications are hereby incorporated by reference for all purposes.

TECHNICAL FIELD

The present invention refers to a method and an apparatus for load identification as well as for detecting the loading condition of a transport element of a transport system with a long-stator linear motor.

BACKGROUND AND SUMMARY

Transport systems with linear motor drive are well known in the state of the art. Common to the transport systems with linear motor drive is that specially formed transport elements, so-called runners, movers or pucks, are moved with the long-stator(s) of one or a plurality of linear motors along a transport conveyor, especially along one or a plurality of guide rails. The transport elements are often used in particular to transport objects, especially containers, preforms or packages, along the transport conveyor. Especially in the beverage processing industry it is often necessary to check the containers filled with beverages or other liquids after the filling process with regard to the fill level of the individual container to ensure that the deviations from the target value of the container filling are not too large. It is also often necessary to check the empty or filled containers for intactness. Finally, when combining a plurality of containers into a secondary package, it is generally necessary to determine whether the transport elements are loaded or unloaded with one container or a plurality of containers, or whether the number of loaded containers is correct.

The state of the art is especially known for methods for the detection of containers, which are conveyed by transport elements, via optical sensors, for example light barriers. It is also known to measure the fill level optically, by means of high frequency, by x-ray or gamma radiation or similar methods. However, the measuring accuracy is often insufficient in case of foaming or sloshing liquids due to transport, as well as expandable containers, so that a reliable determination of the fill level can only be guaranteed by weighing the container. Such a determination of the fill level by weighing individual containers in a specially formed weighing area of the transport system is described for example in WO 2015/144379 A1.

In order to determine the loading condition of a transport element, which can vary, for example, due to the fill level of a transported container, state of the art external and additional measuring sensors as well as correspondingly adapted motion sequences of the transport element are necessary to perform the measurement or detection. Thus, in the state of the art in particular separate measuring sections are provided along which corresponding measuring devices or weighing devices are provided.

However, on the one hand this increases the number of possibly faulty components in the system, on the other hand it generally also limits the total throughput of the system due to a required throughput time caused by the measuring sensors. The additional components also create a cost factor, with further costs arising from the installation and maintenance of the components. Furthermore, measuring sensors are generally installed at specific measuring points as mentioned above. A possibly type-dependent measuring point must be covered by mechanical adjustment of the measuring points or by a multitude of sensors.

The present invention is thus based on the object of providing a method and a device for the identification of a load or recognition of the loading condition of a transport element or a plurality of transport elements of a long-stator linear motor system, which can determine the loading condition, in particular the mass of the carried object(s) or container(s) or packages, with high accuracy. Furthermore, the invention is based on the object of performing the identification of the load of the transport element without significant intervention into the production process in order not to impair the overall productivity of the system. Finally, the detection of the loading condition of a transport element independent of specific measuring points is also desirable.

DESCRIPTION OF THE INVENTION

The above-mentioned objects are solved by a method for identifying a load and/or wear of a transport element of a transport system, in particular loaded with at least one container, with a plurality of transport elements, a, in particular synchronous, long-stator linear motor and a control unit for individually controlled movement of the transport elements along a transport conveyor of the transport system by means of the long-stator linear motor, which comprises the following steps: exciting a dynamic system consisting of the long-stator linear motor and the transport element by controlling the long-stator linear motor by means of the control unit according to at least one excitation pattern, each excitation pattern corresponding to a movement profile of the transport element along the transport conveyor; detecting the movement profile of the transport element along the transport conveyor on the basis of the at least one excitation pattern by means of a position detection device and/or speed detection device of the dynamic system; detecting a temporal course of a load current and/or a load voltage, with which the control unit operates the long-stator linear motor according to the at least one excitation pattern, by means of an integrated measuring device of the long-stator linear motor; wherein a loading condition of the transport element, in particular a load of the transport element, and/or wear of a bearing of the transport element on the transport conveyor is determined by means of the control unit depending on the detected movement profile and the detected temporal course of the load current and/or the load voltage.

The transport elements can each be loaded with at least one container, preform or package. For the sake of simplicity, it will be referred to loading with containers in the following. However, it is understood that this also includes loading with preforms or packages.

Here and in the following, the loading condition of a transport element means whether the transport element is running empty or loaded with an object, especially a container. It is also conceivable that an object is transported by two or a plurality of transport elements together. In this case, the loading condition of a transport element also means whether the transport element is involved in such a joint transport. Furthermore, the loading condition is also to be understood as a number of objects carried along, e.g. containers, if the transport element is formed to transport one or a plurality of containers.

The load of the transport element is here and in the following the mass or weight of a load transported by the transport element, especially at least one transported container. It is understood that the determination of a load of zero corresponds to the determination of an unloaded transport element as loading condition. The identification of a load of the transport element according to the present invention thus comprises on the one hand the observation of whether a given transport element is loaded or unloaded and on the other hand the quantitative determination of the load by determining the mass carried. From the mass carried it can then be determined whether one or a plurality of containers are transported by the transport element. The control unit can also check whether the number of containers carried along corresponds to a target number. Furthermore, especially for glass containers, it can be determined automatically whether the load deviates from a target load due to damage to the container, such as broken glass, and thus the integrity of the transported containers can be determined.

According to one variant the total mass of the system 'transport element plus load' can be determined first, from which the control unit knowing the mass of the unloaded transport element can calculate the carried mass. For the sake of simplicity and clarity, in the following it will always be referred to the determination of the load, even if the determination of the loading condition is included. The separate determination of the loading condition without determination of the load is only mentioned at the corresponding points.

Long-stator linear motor systems are sufficiently well known in the state of the art, so that a detailed description can be renounced. Such a linear motor system has a large number of transport elements, which can be formed as runners, puck, slides, shuttles or the like, which can be moved along the transport conveyor by interaction with at least one linear motor strand of the linear motor formed as long-stator. The transport elements can be individually controlled by the control unit, whereby each transport element can be accelerated, decelerated, moved at constant speed or even stopped completely at times, depending on the requirements of the transport conveyor. The individual controllability of the transport elements results in a variable movement profile of each individual transport element. A movement profile is here and in the following a path-time-profile and/or a speed-time-profile of the movement of the corresponding transport element.

The at least one linear motor strand of the long-stator linear motor can be formed in particular as a synchronous linear motor, since generally no slip occurs with the synchronous linear motor, so that the movement of a transport element with a predetermined movement profile can be carried out more easily by the control unit. In an alternative configuration, however, the at least one linear motor strand can also be formed as an asynchronous linear motor, whereby the transport element can have an electrically conductive element for induction by the asynchronous linear motor.

According to the present invention, the advance of the transport elements along the transport conveyor takes place by magnetic interaction between at least one permanent magnet and/or non-switching electromagnet of a reaction element of the transport element with the at least one long-stator of the long-stator linear motor. The reaction element of a transport element designates the subunit of the transport element, on which a force for moving the transport element is exerted by magnetic interaction with corresponding interaction elements of the long-stator linear motor. For targeted movement of the transport elements, the long-stator linear motor comprises a large number of electrical windings arranged along the respective linear motor train in the form of electromagnets that can be controlled individually or in blocks. More complex configurations are also conceivable, for example, by means of a Halbach-array of the electromagnets to reinforce the magnetic flux on the side facing the reaction element of the transport element. According to the present invention, the transport element is formed as a passive transport element which is moved via the reaction element with at least one permanent magnet and/or non-switching electromagnet by interaction with the electromagnetic alternating fields generated by the individually controllable electromagnets of the long-stator(s). A non-switching electromagnet is thereby connected to a power supply and/or the control unit of the transport device in such a way that a, preferably constant, electric current always flows through it in the same direction.

In order to move a transport element with a desired movement profile along the transport conveyor, the control unit controls the coils of the long-stator individually or in blocks via a corresponding voltage or current pulse, as is generally known in the state of the art. In order to generate a force required for the movement profile, for accelerating the transport element, for overcoming a frictional force at constant speed, or for decelerating the transport element by the magnetic interaction, the coils in the area of the transport element are assigned a corresponding load voltage or a corresponding load current in accordance with the phase. For example, the movement of the transport element can be controlled by a three-phase voltage pulse at the coil(s), whereby the voltage pulse is moved on with the transport element. The phase depends on the actual and desired position of the transport element.

The pulse of the control voltage or control current generated by the control unit is converted by an amplifier into a corresponding load voltage or load current at the coil(s). For this purpose, the control unit can, for example, have a servo amplifier or servo controller which converts the low control voltage to the required higher load voltage. Due to the inductances of the coils used, the actual load current in the coils, and thus the force acting on the transport element, generally lags behind the control voltage or the control current. Furthermore, generally unknown influences occur during the movement of the transport element, which lead to a deviation of the actual movement of the transport element from the movement profile specified by the control unit. Such influences exist, for example, as described in detail below, due to friction, in particular depending on wear of a bearing of the transport element on the transport conveyor, as well as the initially unknown mass of the loaded transport element.

In order to keep the resulting positioning error, i.e. the deviation of the actual position of the transport element from the desired position due to a predetermined movement profile, as small as possible, the transport system according to the invention, as is generally known in the state of the art, has a regulation of the control voltage/control current or the load voltage/load current by means of feedback through a position detection device and/or speed detection device of the transport system. The position detection device measures the actual position of the transport element and returns it as feedback to the control unit. Based on the actual position and optionally an actual speed of the transport element detected by the speed detection device, the control unit can adjust the control voltage or the load voltage accordingly. In addition, the actual load voltage or load current applied to the coil(s) can also be determined by means of suitable measuring devices of the long-stator linear motor and transmitted as feedback to the control unit. Such measuring devices are well known in the state of the art and can be integrated directly into the long-stator as voltage or current meters. Based on the transmitted actual load voltage and/or the transmitted actual load current, the control unit can determine a deviation from the desired load voltage or load current and integrate it into the control of the long-stator linear motor. Control units for controlling the load voltage and/or load current of long-stator linear motors, for example using a PID controller, are generally known in the state of the art and are therefore not described in detail here.

For example, a servo amplifier of the control unit can process the fed back information regarding the actual position, the actual speed and/or the actual strength of the load current in order to transmit a suitable load voltage signal to the long-stator linear motor. The voltage signal can be transferred to the linear motor in the form of pulses with a fixed switching frequency, whereby the pulse duration can also be treated as a parameter to be controlled. The accuracy of control by the control unit can be influenced by the switching frequency and the pulse voltage.

The present invention uses this control of a long-stator linear motor, already known in the state of the art, to generate a desired movement profile of a transport element in order to determine the load of the transport element without the need for additional sensors. The control unit detects the actual movement profile of the transport element along the transport conveyor based on an excitation pattern for controlling the long-stator linear motor by means of the position detection device and/or the speed detection device of the dynamic system consisting of the long-stator linear motor and the transport element.

According to system theory, the long-stator linear motor and the transport element form a dynamic system, from which an input signal, for example a predetermined control voltage or current or movement profile, is converted into an output signal, for example a measured actual movement profile or a measured required load voltage or current. Both the input signal and the output signal can be scalar values, vectors or matrices, as well as time series of these signals. As is well known, the input signals and output signals can be present as continuous signals or as a sequence of discrete values. Mathematically, the relationship between the input signal and the output signal of the dynamic system in frequency space is described by means of a transfer function or system function. There are several approaches to model the dynamic system or the transfer function, as described in detail below. The system model or the transfer function is influenced by a plurality of, initially unknown parameters, among them in particular the load of the transport element or the total mass of the loaded or unloaded transport element.

By determining, especially repeatedly, the input signals as well as the output signals for one or a plurality of excitation patterns of the dynamic system, a, generally overdetermined, system of equations can be established, from which the load of the transport element can be determined by means of the control unit. Here and in the following, an excitation pattern is understood to be a temporal development of a control voltage and/or a control current, with which the control unit controls the corresponding coil(s) of the long-stator linear motor. Thus each excitation pattern corresponds to a movement profile of the transport element along the transport conveyor. As described in detail below, both excitation patterns whose temporal development of the control voltage and/or the control current has been adapted to a predetermined movement profile by the control unit by means of the feedback described above, and excitation patterns which correspond to a predetermined development of the control voltage and/or the control current are included. In the latter case, the movement profile is obtained by taking into account the influences on the dynamic system, e.g. the inductances of the coils and the occurring friction forces.

In accordance with a further development, one or a plurality of excitation patterns can each correspond to a predetermined movement profile of the transport element, whereby the temporal course of the load current and/or the load voltage is adapted by means of the control unit in such a way that the detected movement profile essentially corresponds to the predetermined movement profile. A correspondence essentially exists if the detected movement profile deviates from the predetermined movement profile, apart from a time shift of up to 50 ms, preferably up to 25 ms, by less than 20% of the predetermined movement profile, preferably by less than 10% of the predetermined movement profile. The corresponding excitation pattern thus comprises the above-mentioned temporal development of a control voltage and/or a control current, which corresponds to the predetermined movement profile in so far as, due to this excitation pattern, the required temporal development of the actual load current and/or the actual load voltage to reach the predetermined movement profile is achieved. In this case, the input signal of the dynamic system thus comprises the predetermined movement profile, while the output signal of the dynamic system comprises the actual temporal course of the load current and/or load voltage as adapted by the control unit.

Alternatively or additionally, as mentioned above, one or a plurality of excitation patterns can each correspond to a predetermined temporal course of the load current and/or the load voltage. In this case, the control unit predetermines a temporal course of the corresponding control signals, i.e. the control voltage and/or the control current, as an excitation pattern, which results in the predetermined temporal course of the load current and/or the load voltage. Thus, either the predetermined temporal course of the control voltage and/or control current or the actually measured temporal course of the load current and/or load voltage can be used as input signal of the dynamic system on the basis of the predetermined control signals, while the actually detected movement profile, i.e. the path-time profile and/or speed-time profile, of the transport element which the transport element follows on the basis of the predetermined control signals is used as output signal of the dynamic system.

In both cases of possible excitation patterns the load of the transport element can be determined, for example, as one of the unknown parameters of the transfer function of the dynamic system depending on the detected movement profile and the detected temporal course of the load current and/or the load voltage by means of the control unit. This is due to the fact that the load has a direct influence on an acceleration or deceleration of the transport element via the inert mass of the transport element, including the load, and that even at constant travel the load influences the movement profile of the transport element via the influence of the load-dependent normal force on the occurring friction.

According to the present invention, the dynamic system consisting of the long-stator linear motor and the transport element is thus excited by controlling the long-stator linear motor by means of the control unit according to at least one excitation pattern, each excitation pattern corresponding to a movement profile of the transport element along the transport conveyor. A generally already existing position detection device and/or speed detection device of the dynamic system is then used to detect the actual movement profile of the transport element along the transport conveyor based on the at least one excitation pattern. Thereby, as described in detail below, the time-resolved position and/or speed of the transport element, i.e. the actual path-time profile and/or the actual speed-time profile of the transport element, can be determined by means of suitable sensors of the long-stator linear motor and/or the transport element. In addition, the control unit can also calculate the corresponding speed-time profile from the detected path-time profile by derivation or difference formation. Conversely, the control unit can calculate the corresponding path-time-profile from the detected speed-time-profile by integration or summation. In principle, the detection of the speed-time-profile is equivalent to the detection of the path-time-profile, whereas the independent detection of both profiles increases the accuracy of the calculation.

Likewise, according to the present invention, the actual temporal course of a load current and/or a load voltage, with which the control unit operates the long-stator linear motor according to the at least one excitation pattern, is detected by means of an integrated measuring device of the long-stator linear motor. From the detected movement profile and the detected temporal courses of the electrical load of the long-stator linear motor, a system of equations can be set up as mentioned above, from which the load of the transport element can be determined by means of the control unit as described below. According to the present invention, the greater the number of measurements or the greater the overdeterminacy of the system of equations, the more accurate the load detection is. According to the invention, a plurality of, in particular different excitation patterns can be used by the control unit to perform a corresponding number of measurements. The excitation patterns can be read out by the control unit from a memory of the control unit, for example in the form of a type management, depending on the object or container to be transported.

To simplify the system of equations, the control unit can use known motor parameters of the long-stator linear motor, for example the dimensioning and alignment of the coils and the width of the air gap, to calculate the force acting on the transport element in or against the feed direction from a vector of the actually measured load currents of the individual coils.

According to the present invention, it is thus possible to carry out load identification without additional sensors, merely by means of the transport system, and in particular to determine the mass of the loaded or unloaded transport element. By subtracting the known mass of the transport element, the control unit can thus calculate the mass of the transported object(s), especially containers, from the determined total mass. Since in the case of the plastic and glass containers or metal containers, for example bottles or cans, which are common in the beverage processing industry, the mass of the individual containers is typically constant and relatively well known, for example with deviations of 1 g or less, the filling quantity and thus the fill level can thus be determined with a high degree of accuracy from the determined mass of the filled container according to the present invention. The result of the method according to the invention is thereby independent of foaming or movements of the liquid and also possible for containers where optical systems fail.

Furthermore, knowing the mass of a container as well as the target filling quantity, a number of containers carried by a transport element can be detected by the control unit from the determined load. The control unit can compare the determined number with a target value to detect whether a transport element is incorrectly or insufficiently loaded.

It goes without saying that the method described above can also be applied to groups of two or more transport elements that together transported an object, for example a box or a setup part. In this case, the load of each transport element of the group can be determined separately. In this case, as well as for the common movement of the group of transport elements in general, it is recommended to use identical excitation patterns for the movement of the transport elements of the group. From the determined individual loads of the transport elements of the group, the control unit can determine a total load or a total mass of the transported object. From this total load or mass the control unit can determine the filling state of the object, e.g. of a box, and/or the type of the object, e.g. the size of the boxes or the type of container. For this purpose, the control unit can be equipped with a type management system that stores masses of different object types in a storage unit.

According to the present invention, it is also possible to infer from the determined load a wear of a bearing of the transport element on the transport conveyor, for example a degree of wear of guide and/or bearing elements of the transport element. For this purpose, in particular the load of an unloaded transport element can be determined repeatedly at determined time intervals. The control unit can determine the degree of wear from the temporal change of the determined load. For this purpose, a value for the friction of the guide and/or bearing elements of the transport element during the movement can be determined with knowledge of the mass of the unloaded transport element. An increase in the friction due to increasing wear of the guide and/or bearing elements will then manifest itself as an increase in the determined load. In particular, the control unit can infer wear of the guide and/or bearing elements from the determination of an entrained mass other than zero, which should be determined as zero if an unworn, unloaded transport element is assumed. This wear can be quantified in particular by the control unit, so that a comparison with a threshold value by the control unit is also possible upon whose exceeding the transport element can be supplied to a maintenance.

According to a further development, the method can further comprise an at least partial modeling of the dynamic system according to a grey box model, in particular according to a 2-mass model, whereby the determination of the loading condition of the transport element, in particular the load of the transport element, is carried out by means of the control unit under consideration of the grey box model.

Grey box models are, as described on pages 245 to 247 of the book "Intelligente Verfahren" by D. Schroder, published by Springer-Verlag in 2010, a mixture of white box models and black box models, wherein grey box models contain information from physical equations and measurement data as well as qualitative information in the form of rules. Thus, a grey box model according to the present further development does not correspond to a precise theoretical analysis of the dynamic system, but is based on one or a plurality of assumptions about the dynamic system, for example on simplified friction processes and the neglect of manufacturing tolerances of the involved mechanical components. The grey box model is thus a parametric model in which the parameters can be assigned to a certain model idea, but do not necessarily correspond to physical parameters. Thus, a single parameter of the grey box model can stand for the unknown mass of the loaded or unloaded transport element. However, a plurality of parameters of the grey box model can also have a dependence on the mass of the transport element, so that the mass can be determined from these parameters.

For example, a simple 1-mass system can be used as a physical model of the load, or for a more precise determination of the load a 2-mass model, i.e. a model of the 2-mass oscillator, can be used to express the physical relationship between cause (force) and effect (motion). In the 1-mass system, therefore, the entire loaded transport element, i.e., for example, the system consisting of the transport element, container and liquid in the container, is treated as a single rigid mass. Such a simplified load model can be used, for example, to determine only the loading condition, i.e. unloaded or loaded, or the number of loaded containers of the transport element. In this case, especially other influences like friction can be neglected.

The more realistic 2-mass model can, for example, take into account oscillations and vibrations of the transported container(s) with respect to the transport element and/or the liquid in the container(s), which have an influence on the actual movement profile of the transport element. A large number of state of the art modeling approaches of dynamic systems can be applied according to the present further development. For example block-oriented nonlinear models with dynamic transfer functions, especially a Hammerstein or a Wiener model, or combinations of these models can be used. Furthermore, artificial neural networks can be used to model the dynamic system. A variety of alternative modeling approaches is possible and can be used depending on the requirements of the dynamic system to be modeled.

In particular, the grey box model can be formed taking into account a temperature of the dynamic system, in particular of guide and/or bearing elements of the long-stator linear motor and/or transport element, and/or taking into account a degree of wear of guide and/or bearing elements of the long-stator linear motor and/or transport element and/or taking into account tolerances of mechanical components of the long-stator linear motor and/or transport element.

Temperature influences, for example by changing the temperature of the guide and/or bearing elements of the long-stator linear motor, for example of guide rails, and/or of the transport element, for example of rollers or sliding carriages, with which the transport elements are movably mounted on the guide elements of the long-stator linear motor, can be taken into account in the modeling, for example by considering a temperature dependence of the friction. The method may include measuring the temperature of the guide and/or bearing elements by means of one or a plurality of temperature sensors of the transport system, whereby the measured temperatures are included as part of the input signal in the determination of the load of the transport element. It is also possible to react to temperature influences, for example during the cold-running or warming-up phase of the transport system, by accepting a larger tolerance window with respect to the determined masses in the cold state of the transport system and only working with great accuracy when the transport system is run in.

Wear effects due to the at least partial mechanical support of the transport elements on the transport conveyor, especially on guide elements of the long-stator linear motor, for example due to roller wear, change the properties of the linear motor and the friction coefficients of the transport element. In order to counteract a falsification of the result of the load determination, as part of the re-initialization of the transport system when starting up the transport system, each transport element can be identified in the unloaded condition and thus changing parameters and properties can be detected and compensated in the calculation. In particular, wear-dependent parameters can be included in the grey box model, the value of which can be adjusted by reference measurements on unloaded transport elements as mentioned above and described in more detail below.

Thus, the modeling of the dynamic system can be done once as part of a calibration of the transport system or it can be adapted repeatedly after calibration by repeating the adjustment of parameters that have been included in the model, especially in case of reference measurements with unloaded transport elements. Thus, the grey box model can be used, apart from the mass of the transport element to be determined, with temporally constant parameters or as an adaptive model with variable parameters. The use of artificial neural networks is particularly suitable for an adaptive model.

Tolerances of mechanical components of the long-stator linear motor and/or the transport element can also lead to different motor characteristics and friction coefficients at different points along the transport conveyor and/or for different transport elements. For example, a possible mechanical stiffness and air gaps of different sizes have an influence on the actual movement profiles. In order to reduce the influence of tolerances, the load identification can always be performed in the same area of the transport conveyor and be detected in the modeling as a relative measurement to previous measurements. Critical values in the relative values allow the detection of errors. Furthermore, the transport elements can be equipped with identification devices by which each transport element can be clearly identified, so that the modeling of the dynamic system can be performed specifically for each transport element. In this case deviations due to tolerances of the transport elements can be explicitly included in the respective modeling of the dynamic system.

In accordance with a further development, the method can further comprise an at least partial modeling of the dynamic system, in particular of a transfer function, according to a black box model, whereby the determination of the loading condition of the transport element is carried out by means of the control unit under consideration of the black box model. In contrast to the grey box model, the black box model only provides insufficient knowledge about the system behavior, so that only an experimental analysis can be performed. The parameters of the black box model have no physical meaning, so that it is also referred to a non-parametric model, which only represents the input/output behavior. In such a model, the mass of the (loaded) transport element to be determined can be treated as part of the output signal, while both the detected movement profile and the detected temporal course of the load current and/or load voltage are treated as part of the input signal. For the black box modeling by means of an adaptive artificial neural network is particularly useful. The artificial neural network can be trained as part of a calibration by means of known masses and given excitation patterns, in order to be used afterwards in the operation of the transport system to determine the loading condition, in particular the load or mass of the transport element.

However, the present invention is not limited to the described models. For example, a black box model can be used in which one or a plurality of parameters of the transfer function show a mass dependence, so that the mass can be determined from the particular transfer function. In this case, however, the mass dependence of the individual parameters is unknown and therefore, unlike a grey box model, cannot be introduced into the model on the basis of a partial system analysis. Furthermore, a combination of different models is conceivable, for example a grey box model for the load dependence of friction and a black box model for mechanical tolerances and temperature dependence of friction.

In accordance with a further development, the method can further include a repeated or continuous determination of the loading condition, in particular the load, of the transport element, whereby one or a plurality of parameters of the model are adjusted by means of the control unit on the basis of the determined loading condition. According to this further development, the loading condition or the load of the transport element is observed. As already mentioned above, this method differs from the unique modeling of the dynamic system, for example as part of a calibration of the transport system, in that the parameters of the underlying model are regularly or continuously adjusted during the operation of the transport system. Such an adjustment helps improving the accuracy of the model and can also take into account possible temporal changes of the transport system, for example due to increasing wear.

In particular, an adaptation of the parameter(s) of the model used can be made on the basis of repeated measurements with known load, i.e. repeated measurements on a transport element loaded with a specific container and in particular repeated measurements on an empty transport element. The adjustment of the parameters can be carried out by using an optimization procedure, for example by minimizing the faults based on past measurements taking into account the current measurement. For example, a least mean square algorithm, a simplex algorithm or a gradient descent method can be used. In order to take into account a possible temporal development of the parameters, it is possible, for example, to average over the parameters obtained from one or a plurality of previous measurements and the parameters obtained from the current measurement.

The repeated or continuous determination of the loading condition of the transport element can also be used to detect unexpected load changes of a transport element, for example due to loss or damage of the transported container. If, for example, a change of a parameter by more than a predetermined limit value with respect to the previous measurement is detected by the control unit, this generally indicates such an unexpected load change.

An adjustment of the parameters of the model is especially recommended when using a black box model, since with the grey box model the physical relationships underlying the model remain unchanged. Nevertheless, the parameters of a grey box model can be adjusted by repeated or continuous determination of the loading condition of the transport element. As already mentioned, such an adjustment can be carried out particularly effectively when using an artificial neural network to model the dynamic system. Thus, the artificial neural network learns during the operation of the transport system by repeatedly or continuously determining the load of the transport element.

While in the case of the one-time calibrated grey box model, a peak load of a computing unit, for example a CPU, of the control unit required during calibration is higher, the base load of the computing unit is higher in the case of the continuous adaptation of the model described above. However, the calibration can be performed before or during the start-up of the transport system or at lower load. While using a one-time calibrated model at a defined point in time gives a fixed result, repeated or continuous adjustment of the model parameters can improve the accuracy of the result.

According to further development, the number of excitation patterns can be larger, preferably ten times larger, especially preferably one hundred times larger than the number of parameters to be determined for the respective model. In particular, only different excitation patterns can be used to obtain independent measurement results. A high degree of overdetermination of the resulting system of equations can be achieved by using essentially uncorrelated excitation patterns, i.e. excitation patterns for which a mutual cross-correlation coefficient is particularly small, in particular smaller than 0.5. Excitation patterns with low autocorrelation, i.e. a correlation coefficient smaller than 0.5, can also be used. The respective correlations can be calculated with respect to the temporal course of the predetermined position, the predetermined speed, the predetermined control voltage or the predetermined control current. Essentially uncorrelated excitation patterns lead to measurements which are as independent as possible and allow the load of the transport element to be determined as accurately as possible. The excitation patterns can be predetermined with knowledge of the motor parameters and stored in a storage unit of the control unit, or they can be adapted in the form of parameterized test functions depending on an error of the determined load.

The number of excitation patterns can be chosen so high that a strongly overdetermined system of equations is established by the control unit. For example, 1000 equations can be set up for 5 parameters to be identified. It is not necessary to specify 1000 different excitation patterns. Alternatively or in addition, an excitation pattern can contain several sections, for example areas with different speed and/or different acceleration of the transport element, which each lead to their own equations. In general, an excitation pattern can be defined as a sequence of acceleration and deceleration processes as well as sections of constant travel. The number of used excitation patterns also depends on the application of the described method. For example, for the pure determination whether the transport element is empty or loaded or whether the transport element carries the predefined number of containers, a small number of excitation patterns, possibly a single excitation pattern, may be sufficient. If an exact identification of the mass is required, a much higher number of excitation patterns leads to a more accurate determination of the mass.

In the case in which the number of excitation patterns exceeds the number of parameters of the model to be determined, a minimization of an error of the overdetermined model can be carried out according to the least mean square algorithm by means of the control unit. Linear methods or nonlinear methods, such as the simplex algorithm or a gradient descent method, can be applied. The control unit thus performs an optimization procedure based on the overdetermined system of equations, which minimizes the error of all equations.

At least one of the excitation patterns can correspond to a movement of the transport element with constant speed and/or at least one excitation pattern can correspond to an accelerated movement of the transport element. When the transport element moves at constant speed, the mass of the transport element affects the frictional force and thus the feed force required to maintain constant speed. In case of an accelerated movement of the transport element, in addition to the mass-dependent frictional force, the effect of the inert mass also occurs. Both movements are therefore in principle suitable to determine a load of the transport element.

The friction in the mechanical system, which is formed by the at least partially mechanical bearing of the transport elements on the transport conveyor, for example by means of rollers and/or sliding carriages, generally comprises both a load-dependent component due to the mass-dependent normal force and a speed-dependent component. Because of the speed-dependent component, excitation patterns with constant travel at different speeds can be used to independently determine the load of the transport element. For example, the excitation pattern can correspond to a step function in a speed-time-course, wherein at each speed of this course a separate determination of the load can be made.

Due to the influence of the inert mass, excitation patterns with different accelerations lead to independent determinations of the load. Accordingly, the excitation pattern can also correspond to a step function in an acceleration-time course. In this case, a separate determination of the load can be made for each acceleration of this course. It is understood that combinations of the above described excitation patterns are also possible. Furthermore, the excitation patterns can also be selected with respect to an available measuring section of the transport system, so that the movement profiles of the transport elements can be implemented within the measuring section. In order to have as little influence as possible on the throughput of the transport system, the excitation patterns can also be selected in such a way that the acceleration or constant travel takes place at a speed close to the usual operating speed. In this way a reliable detection of the load during normal operation of the system can be achieved.

The excitation patterns can also be selected in such a way that repeated measurements are performed at different points along the transport conveyor. In this way, the loading condition of a transport element can be continuously monitored so that missing or defective containers can be effectively detected due to the resulting change in mass. In particular, the measurements can be carried out in an area of the transport conveyor that has an incline. In this case a corresponding feed force is required to overcome the corresponding part of the weight force of the load already at constant travel. In addition to the load-dependent friction and the influence of the inert mass, the influence of the heavy mass also acts on uneven areas of the conveyor track which can also be used for the independent determination of the load of the transport element. For this purpose the known incline can be used as a parameter in a corresponding grey box model.

The above-mentioned objects are also solved by a transport system for transporting loads, comprising: a, in particular synchronous, long-stator linear motor, a plurality of transport elements, and a control unit which is adapted to move the transport elements by means of the long-stator linear motor in an individually controlled manner along a transport conveyor of the transport system, the transport system further having a position detection device and/or a speed detection device, in particular along at least a partial section of the transport conveyor, for detecting a movement profile of a transport element, the long-stator linear motor having an integrated measuring device for detecting a temporal course of a load current and/or a load voltage, with which the control unit operates the long-stator linear motor, and wherein the control unit is adapted to control a plurality of individually controllable electromagnets of the long-stator linear motor in accordance with at least one excitation pattern, each excitation pattern corresponding to a movement profile of the transport element, and to determine a loading condition, in particular a load, of the transport element and/or a wear of a bearing of the transport element on the transport conveyor depending on at least one detected movement profile and at least one detected temporal course of the load current and/or the load voltage.

Here, the same variations and further developments described above in connection with the method according to the invention for identifying a load of a transport element can also be applied to the transport system for transporting loads. In particular, the further development of the long-stator linear motor and the transport elements described above can be applied to the transport system. The magnetic linear drive of the long-stator linear motor can be formed as a synchronous or as an asynchronous linear motor with at least one linear motor strand in the form of a long-stator equipped with a plurality of electrical windings in the form of electromagnets, i.e. coils, which can be controlled individually or in blocks. To enable magnetic interaction between a transport element and the individually controllable electromagnets of the long-stator linear motor, the transport element can be equipped as a passive transport element with at least one permanent magnet and/or non-switching electromagnet.

Furthermore, the transport element can be adapted to transport container packages or a container, in particular one or a plurality of containers or container packages filled with a liquid. Containers can be especially bottles or cans. As mentioned, one or a plurality of preforms can also be transported. To transport the container, the transport element can be equipped with a suitable holding device, for example in the form of a gripping element. In particular, gripping elements for the positive or frictional gripping of a neck area of the container, for example in the so-called neck handling of plastic bottles, are conceivable, whereby the held container is mounted in the gripping element so that it can rotate around its longitudinal axis during positive gripping. The transport element can be formed as a runner, puck, carriage, shuttle or similar, which is moved by suitable interaction with the long-stator linear motor.

Furthermore, the transport element may comprise a clear identification unit, for example in the form of a bar code, readable memory chip, printed, glued-on and/or engraved alphanumeric code, etc., whereby one or a plurality of suitable identification detection devices along the transport conveyor enable identification of the transport element passing the corresponding identification detection device. In particular, the identification unit of the transport element can be used, as described above, for the specific modeling of the dynamic system consisting of this transport element and the long-stator linear motor.

To guide the transport elements along the transport conveyor, the transport system, and in particular the transport conveyor, can have one or a plurality of guide rails and/or one or a plurality of guide channels. The transport elements can be supported on these guide elements by means of one or a plurality of suitably arranged guide rollers, slide bearings and/or a guide pin. With this at least partially mechanical bearing, the frictional forces described above occur.

According to the invention, the transport system comprises a position detection device and/or a speed detection device with which a path-time profile or a speed-time profile of the movement of the transport element can be detected. The position detection device and/or the speed detection device can be adapted as an integrated measuring device of the long-stator linear motor. Alternatively or additionally, measuring devices for determining the position and/or speed of the transport elements can be provided as part of the respective transport elements.

For example, sensors can be arranged at least along a section of the transport conveyor, which are adapted to determine the position and/or speed of a transport element in the area of these sensors. The sensors can be adapted as optical sensor, electrical sensor, electromagnetic sensor or mechanical sensor, whereby the position of the transport element can be determined, for example, by measuring a light reflection at a reflector element of the transport element, by induction of an electromagnetic signal due to the movement of the transport element, by changing the electrical resistance of the sensor using a magneto-resistive effect, for example due to a magnetic flux change caused by the movement of the transport element comprising a magnetic reference element, or by local pressure measurement due to the weight of the transport element. An electromagnetic sensor can also be formed as a Hall sensor. Hall sensors allow, for example, the localization of a transport element with an accuracy of 0.2 mm to 1 mm. Magnetostrictive displacement sensors can also be used as sensors, which determine the position of the transport element using magnetostriction. The measuring element is a waveguide made of a magnetostrictive material, through which a conductor is threaded. A permanent magnet arranged on the transport elements acts as a position sensor and leads to the magnetostriction of the waveguide, which generates a mechanical wave propagating to both sides. The position of the transport element can be determined from the propagation of the wave.

Further possible sensors are proximity sensors of inductive or capacitive type regularly arranged at the transport conveyor, as well as incremental or absolute value encoders formed as linear or rotary encoders. With incremental encoders, it may be necessary that a reference run first determines the absolute position of the transport elements when the transport system is started up. With inductive sensors, the amplitude of the induced current pulse or voltage pulse can also be used to determine the speed of the transport element. The speed of the transport element can also be determined from the measured data of incremental sensors.

With the position detection devices or speed detection devices known in the state of the art, generally one part of the device is formed as part of the transport elements, while another part of the device is formed as part of the transport conveyor or long-stator linear motor. For example, a large number of sensors can be arranged, especially regularly, along the transport conveyor or a section of the transport conveyor, while an element detectable by the sensors, for example a reference magnet, an optical mark or a reflector, is provided as part of the transport elements. Conversely, sensors can be provided as part of the transport elements, wherein elements to be detected, for example a periodic arrangement of optical markings or reference magnets, are arranged along the measuring path. In this case a transmission device, for example a signaling device, can be provided as part of the transport elements, by means of which counting pulses or measurement data can be transmitted to the control unit. Alternatively or additionally, the transport elements can have a signal unit which detects one or a plurality of position signals sent by spatially separated signal units of the control unit of the transport system in order to determine the position of the transport element along the transport conveyor, for example by means of transit time measurements. This signal unit of the transport element can be an RFID chip.

The positions and/or speeds of the transport elements detected by the sensors of the transport elements and/or the long-stator linear motor or the transport conveyor are transmitted via appropriate radio antennas or signal lines to the control unit of the transport system, which processes them as described above.

Furthermore, according to the present invention, the long-stator linear motor is equipped with an integrated measuring device for detecting a temporal course of a load current and/or a load voltage applied to the individual electromagnets or coils of the long-stator. For this purpose, a voltmeter or ammeter known per se or other devices known in the state of the art for measuring an electric voltage or current may be provided on each individual coil or coil block, the measurement data also being transmitted to the control unit. From the transmitted movement profiles and temporal courses of the electrical load of the coils of the long-stator linear motor, the control unit calculates the loading condition, in particular the load of the transport element, as described in detail above.

As described above, the control unit may comprise one or a plurality of processor units, which are used to perform the calculations described above. In particular, the control unit can be adapted as a programmable logic controller. In addition, the control unit can comprise a servo amplifier or servo controller or be formed as such. A servo amplifier or servo controller is adapted to convert the predetermined or calculated control signal into a suitable input signal for the long-stator linear motor. In particular, the control unit can be adapted to generate three-phase voltage pulses for the coils of the long-stator linear motor. In particular, the further development of the control unit and the servo controller described above can be applied here.

The transport system can also have one or a plurality of temperature sensors that are adapted to measure a temperature of guide and/or bearing elements of the transport system and transmit them to the control unit. The measured temperatures can then be taken into account by the control unit as described above, e.g. to include a temperature dependence of friction in the modeling of the dynamic system.

As described above, the control unit can also have a storage unit for storing a large number of predefined excitation patterns, for example in the form of corresponding sequences of control signals, whereby the usual state-of-the-art storages can be used.

The transport conveyor of the transport system can have a special section for the detection of the movement profile of the transport elements, wherein the above-mentioned sensors can be arranged only along this section. Alternatively, however, sensors or measuring elements can be arranged along the entire transport conveyor, so that the movement profile can be detected at any position of the transport conveyor. This further development is especially advantageous when using the above described method for repeated and continuous determination of the load.

According to further development, the section can be straight and flat, whereby at least one excitation pattern corresponds to a movement of the transport element at constant speed and/or at least one excitation pattern corresponds to an accelerated movement of the transport element. In the case of a straight and flat section, the dynamic system is simplified in that the weight force acting through the mass of the transport element is perpendicular to the transport conveyor. Since the section is straight, no centrifugal forces occur beyond this, which can cause the transported load to swing, for example by sloshing a liquid in the transported container. In the case of a movement with constant speed, the influence of the mass on the friction is determined in particular, as described above, whereas in the case of an accelerated movement the influence of the inert mass also occurs.

According to an alternative further development, the section can be curved in a vertical direction, especially with varying curvature, whereby optionally at least one excitation pattern corresponds to a movement of the transport element at constant speed. A vertical direction here and in the following is to be understood in the sense of the direction of the weight force. Since the section is curved in the vertical direction according to this further development, at least a part of the section has an incline or a decline. Thus, as described above, the influence of the heavy mass is added, which opens up further possibilities for independent measurements. The curvature of the section leads to a change in the incline, which varies the proportion of the weight of the mass of the transport element that must be overcome by the feed force. A varying curvature allows the transition from a plane to an incline and back to a higher plane, or vice versa. Sections with varying curvature can be especially provided as part of the transport system to overcome a difference in height. Preferably, the transport system according to the invention can be formed in such a way that the measurements described above are carried out on already existing sections to overcome a height difference in order to determine the load of the transport elements. In order to avoid an inclined position of the transported load, gripping elements of the transport elements, with which containers are held, can be formed to rotate.

The present invention allows the reliable and precise determination of a loading condition or load of a transport element without any additional required components. In general, the present invention allows the determination of various important parameters for transport elements such as mass and friction. Only an appropriately adapted control unit is required for this purpose. Thus components can be saved compared to the systems known in the state of the art, which in turn leads to cost savings. Since integrated measuring devices of the transport system are used, the flexibility of the determination of the load is increased, since the measurement can be carried out at different locations of the transport system. In addition, the excitation patterns can be selected in such a way that the measurements do not significantly limit the system performance. In particular, the usual waiting time for external measurement sensors is dispensed with. Finally, no mechanical adjustment due to different types or parts of the mountings is necessary. The present invention thus makes advantageous use of generally available devices of a long-stator linear motor system to determine the load, i.e. mass of transported containers during operation of the system.

BRIEF DESCRIPTION OF THE FIGURES

Further features and exemplary embodiments as well as advantages of the present invention will be explained in more detail below on the basis of the drawings. It is understood that the embodiments do not exhaust the scope of the present invention. It is also understood that some or all of the features described below can also be combined in other ways.

DETAILED DESCRIPTION

Figure 1:
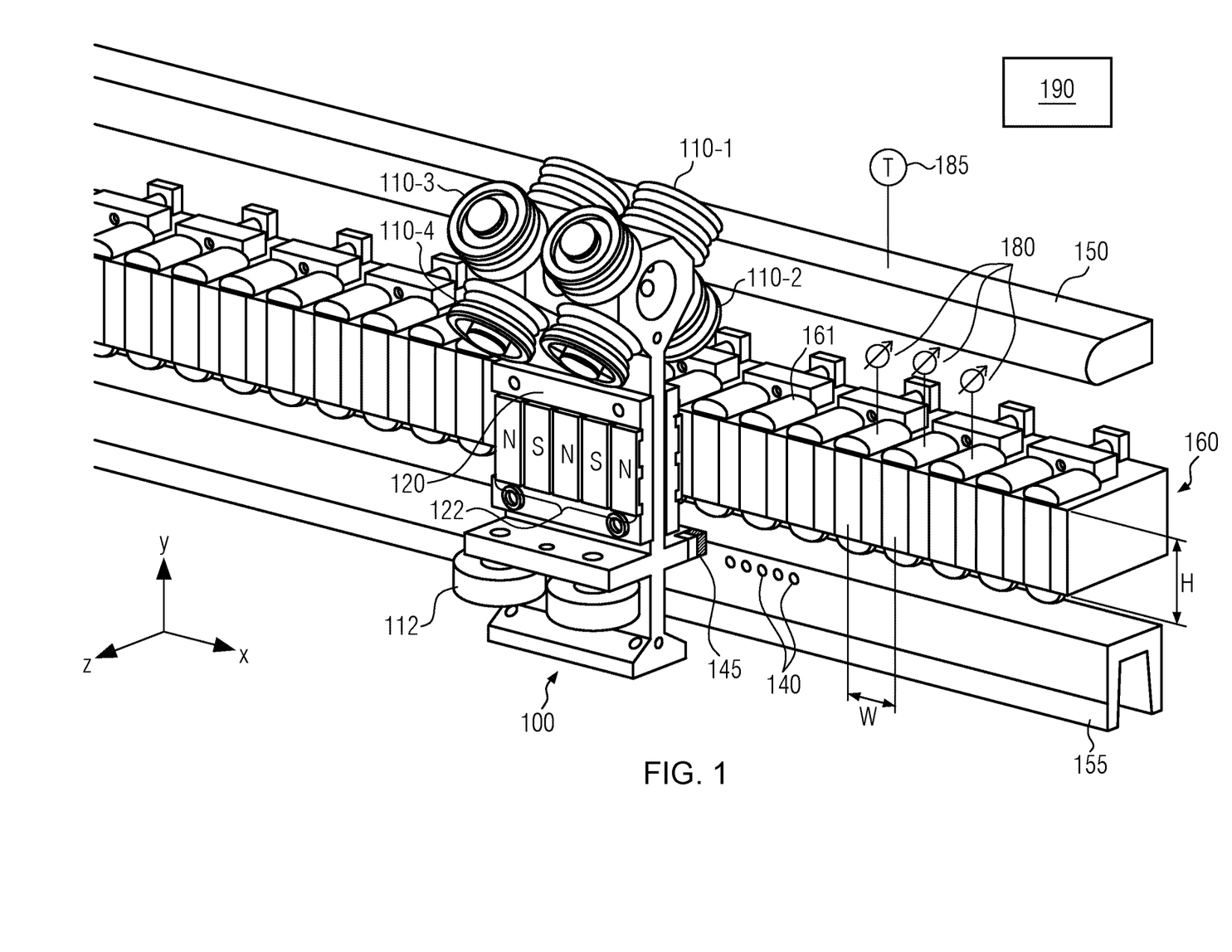
FIG. 1 shows a schematic representation of a transport system with a long-stator linear motor according to the present invention.

FIG. 1 shows a schematic representation of a transport system with a long-stator linear motor for detecting a load of a transport element according to the present invention. The exemplary further development shown here shows a specific arrangement of the transport system in which a long-stator 160 of the linear motor is arranged laterally of a vertically oriented secondary part, i.e. reaction element, 120 of a transport element 100. It is understood, however, that the present invention is not limited to such a vertical arrangement, but can also be applied to a horizontal arrangement of the secondary part. Likewise, 120 long-stators 160 can be provided on both sides of the secondary element. The further development presented here therefore serves only to illustrate the present invention, without intending to restrict the special further development of the long-stator linear motor and the transport element.

FIG. 1 shows a schematic representation of a transport element 100, representative for the large number of transport elements. The transport element 100 shown here as an example is movably mounted on an upper guide rail 150 via rollers 110-1 to 110-4. In addition, the non-limiting transport element of FIG. 1 has guide rollers 112 which guide the transport element on a lower guide rail 155. Both the rollers 110-1 to 110-4 and the guide rollers 112 are subject to friction with the respective guide rails, whereby this friction is load-dependent due to the inclined position of the rollers. For the sake of clarity, only the rear guide rails 150 and 155 and the rear long-stator 160 are shown in the schematic diagram in FIG. 1. However, it is understood that, as mentioned above, corresponding front guide rails and a front long-stator can be additionally provided. A large number of variations of the shown bearing of the transport element 100 is conceivable and compatible with the further development of the present invention described above.

As shown schematically in FIG. 1, the long-stator 160 has a number of magnetic windings, i.e. coils 161, whose iron cores have a height H perpendicular to the direction of motion, i.e. in the Y direction. The coils 161 are arranged at a distance W from each other along the long-stator. The alternating magnetic fields of the coils 161 interact with the permanent magnets of the secondary part 120 arranged with alternating polarity N and S in a row 122, which is shown in a vertical configuration. Instead of the non-limiting sequence of alternating polarities shown here, a single magnet can also be used as a magnet of the secondary part 120.

Furthermore, in the exemplary further development of the transport element of FIG. 1, a permanent magnet is arranged as a reference magnet 145 on the secondary part 120 of the transport element. When the transport element 100 is moved, this reference magnet 145 is moved past a series of regularly arranged sensors 140, for example inductive sensors, which are arranged along the lower guide rail 155. For the sake of clarity, only a small number of sensors 140 are shown in FIG. 1, whereby the sensors 140 can be provided at least along a section of the transport system or even along the entire transport system. Due to the movement of the transport element 100, the sensors 140 experience a magnetic flux change due to the moved reference magnet 145, which can be used to determine a position and/or a speed of the moved transport element. For example, magneto-resistive sensors can be arranged at a distance of 10 to 15 mm from the transport element, allowing the position of the transport element to be determined continuously. For this purpose the sensors 140 transmit their measuring signals continuously or in periodic intervals to the control unit 190 of the transport system, which calculates the position and/or speed of the transport element 100 from the measuring signals of one or a plurality of sensors 140. The exemplary shown sensors 140 thus form an integrated position detection device and/or an integrated speed detection device by means of which the control unit 190 detects a movement profile of the transport element 100 as described above.

In the further development in FIG. 1, an integrated measuring device 180 of the long-stator 160 for continuous or periodic measurement of the load voltage actually applied to coils 161 or the load current actually flowing through coils 161 is also shown schematically. Such a measuring device for continuous measurement of the electrical load of a long-stator is generally integrated into the long-stator to enable control of the coil control via feedback to the control unit 190. The measuring device 180, of which only a few sensors are shown in FIG. 1, thus transmits the measured load voltages and/or load currents to the control unit 190, which, as described above, either adapts the actual electrical load signals on the coils according to a predefined movement profile or detects the actual electrical load signals based on predefined control signals.

From the transmitted measurement data of the position detection device 140 and/or speed detection device 140 as well as the integrated measuring device 180, the control unit 190 determines the loading condition or the total mass of the transport element 100 by controlling the long-stator linear motor 160 according to at least one excitation pattern as described above. For example, the transport element 100 may have a gripping device (not shown) for transporting a container (not shown), whereby the control unit 190 can calculate the mass of the transported container and/or the number of containers carried by subtracting the known mass of the unloaded transport element 100. In doing so, the control unit 190 can take into account a temperature of the guide rails 150 as described above, which is measured by means of a temperature probe 185 as shown in FIG. 1. In particular, the measured temperature can be incorporated as a known temperature dependence of a rolling friction of the bearing rollers 110-1 to 110-4 on the guide rail 150 into a grey box model, which the control unit 190 uses to determine the load of the transport element 100.

Figure 2:
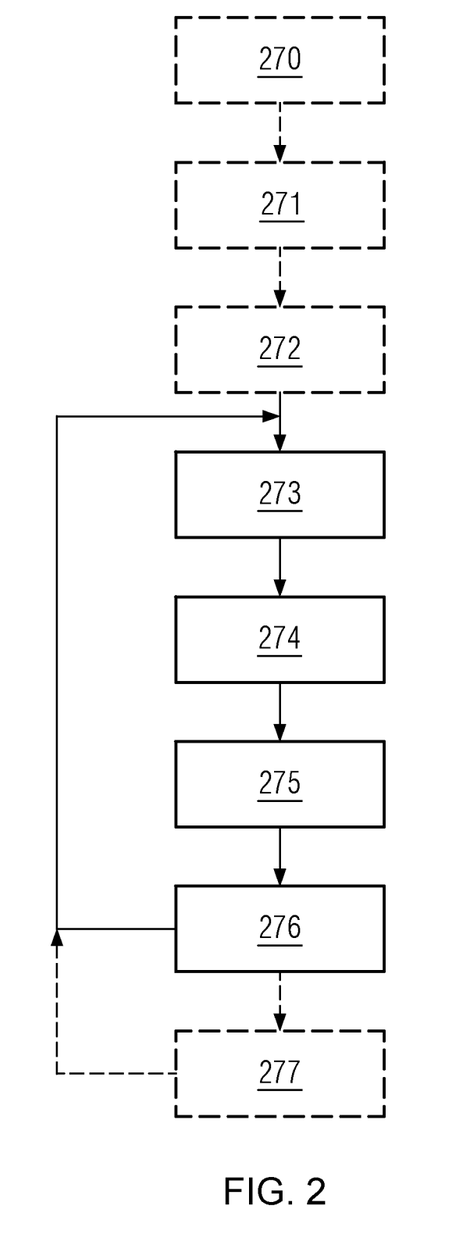
FIG. 2 shows a method for identifying a load of a transport element according to the present invention.

FIG. 2 shows a method for identifying a load and/or wear of a transport element according to the present invention. The method steps outlined in dashed lines are optional.

In step 270, a large number of excitation patterns can first be predefined or calculated, which can be used by the control unit for the excitation of the dynamic system consisting of long-stator linear motor and transport element. As described above, these excitation patterns can, in particular, represent different movement profiles of the transport element or temporal courses of control signals. In general, the excitation patterns are predefined by a developer or user of the transport system. Additionally, in step 271 a modeling of the dynamic system is performed using a grey box model or a black box model or a combination of these models. Thereby, known physical relationships and motor parameters can be included in the modeling of the dynamic system. This step is also usually performed by a developer or user of the transport system, especially before the transport system is put into operation.

In step 272, the transport system can first be calibrated using predetermined excitation patterns and known masses, whereby the respective model is conditioned as described above. The calibration can be performed before initially operating the system or at each start-up of the system as part of an initialization. As part of the calibration, individual friction values of the bearings of the transport elements can also be determined as described above. Here the identification units of the transport elements can be used for the clear allocation of the friction values or the degrees of wear of the bearing elements.

After completion of the calibration the operation of the system is started. During normal operation an excitation of the dynamic system consisting of long-stator linear motor and transport element takes place by controlling the long-stator linear motor by means of the control unit according to at least one excitation pattern in step 273. The excitation of the dynamic system can, in particular, as described above, include an adaptation of the electrical load or the control signals in such a way that the actual movement profile of the transport element essentially corresponds to a predetermined movement profile. The excitation step 273 can especially include an excitation with a variety of excitation patterns.

Then, in step 274, the actual movement profile of the transport element is detected by means of a position detection device and/or a speed detection device. In step 275, the temporal course of the actual load current and/or the actual load voltage is also detected by means of an integrated measuring device of the long-stator linear motor. Based on the detected movement profile and the detected temporal course of the electrical load, the control unit constructs a generally overdetermined system of equations on the basis of the excitation patterns, from which in step 276 the loading condition and in particular the mass of the transport element is calculated. The method can then return to step 273. Optionally, however, in step 277 the result of the load determination from step 276 can be used to adapt the model generated in step 271, i.e. one or more parameters of this model. It is also conceivable here to consider and monitor the friction occurring in the bearing elements. In this case, the method returns to the excitation of the dynamic system in step 273 only after the model has been adapted. The sequence consisting of excitation, detection of the movement profile and electrical load as well as load determination with optional adaptation of the model can be executed repeatedly, as required, in order to monitor a loading condition of the transport element. This allows in particular to detect a sudden change in the load of the transport element due to damage or loss of a transported container. Likewise, by repeatedly performing the described method, the accuracy of the model can be increased, which increases the accuracy of the mass determination of the transported container. The method can be used without significant interference with the regular operation of the system and generally without additional sensors.

The invention claimed is:

1. Method for identifying a load and/or a wear of a transport element of a transport system with a plurality of transport elements, a synchronous, long-stator linear motor and a control unit for individually controlled movement of the transport elements along a transport conveyor of the transport system by means of the long-stator linear motor, comprising:

exciting a dynamic system consisting of the long-stator linear motor and the transport element by controlling the long-stator linear motor by means of the control unit according to at least one excitation pattern, each excitation pattern corresponding to a movement profile of the transport element along the transport conveyor;

detecting the movement profile of the transport element along the transport conveyor on a basis of the at least one excitation pattern by means of a position detection device and/or speed detection device of the dynamic system;

detecting a temporal course of a load current and/or a load voltage, with which the control unit operates the long-stator linear motor according to the at least one excitation pattern, by means of an integrated measuring device of the long-stator linear motor;

wherein a loading condition of the transport element, including a load of the transport element, and a wear of a bearing of the transport element on the transport conveyor, is determined by means of the control unit depending on a detected movement profile and a detected temporal course of the load current and/or the load voltage, and the movement profile is a path-time-profile and/or a speed-time-profile of movement of the transport element.

2. The method according to claim 1, wherein one or a plurality of excitation patterns each correspond to a predefined movement profile of the transport element, and wherein the temporal course of the load current and/or the load voltage is adapted by means of the control unit in such a way that the detected movement profile substantially corresponds to a predetermined movement profile.

3. The method according to claim 1, wherein one or a plurality of excitation patterns each correspond to a predefined temporal course of the load current and/or the load voltage.

4. The method according to claim 2, further comprising an at least partial modeling of the dynamic system according to a grey box model, wherein determining the loading condition of the transport element is carried out by means of the control unit taking into account the grey box model.

5. The method according to claim 4, wherein the grey box model is formed taking into account a temperature of the dynamic system, and/or a degree of wear of guide and/or of bearing elements of the long-stator linear motor and/or of transport element and/or of tolerances of mechanical components of the long-stator linear motor and/or of transport element.

6. The method according to claim 1, further comprising an at least partial modeling of the dynamic system according to a black box model, wherein determining the loading condition of the transport element is carried out by means of the control unit taking into account the black box model.

7. The method according to claim 4, further comprising repeated or continuous determining of the loading condition of the transport element, wherein one or a plurality of parameters of the model are adjusted by means of the control unit on the basis of a determined loading condition.

8. The method according to claim 4, wherein a number of the excitation patterns is larger than a number of parameters of the model to be determined.

9. The method according to claim 8, further comprising minimizing an error of an overdetermined model by means of the control unit.

10. The method according to claim 1, wherein at least one excitation pattern corresponds to a movement of the transport element at constant speed and/or at least one excitation pattern corresponds to an accelerated movement of the transport element.

11. The method according to claim 10, wherein the excitation pattern corresponds to a step function in a speed-time course or an acceleration-time course.

12. The method according to claim 4, wherein a loading condition of a group of transport elements adapted to jointly transport an object is determined, and wherein the control unit is used to determine the type and/or the mass of the transported object on the basis of the loading status or the load of each transport element of the group.

13. The method according to claim 1, wherein the movement profile and the temporal course of the load current and/or the load voltage of an unloaded transport element are repeatedly detected by means of the control unit at time intervals, and wherein the control unit determines a degree of wear of the bearing of the transport element on the basis of a temporal change of the determined load of the transport element.

14. The method according to claim 13, further comprising determining a number of containers transported by the transport element on the basis of the determined load.

15. Transport system for the transport of loads, comprising:

a synchronous, long-stator linear motor, a plurality of transport elements, and a control unit, which is adapted to move the transport elements along a transport conveyor of the transport system in an individually controlled manner by means of the long-stator linear motor wherein the transport system further comprises a position detection device and/or speed detection device along at least a section of the transport conveyor for detecting a movement profile of a transport element, and wherein the long-stator linear motor has an integrated measuring device for detecting a temporal course of a load current and/or a load voltage with which the control unit operates the long-stator linear motor;

wherein the control unit is adapted to drive a variety of individually drivable electromagnets of the long-stator linear motor according to at least one excitation pattern, each excitation pattern corresponding to a movement profile of the transport element, and to determine a loading condition, including a load of the transport element and a wear of a bearing of the transport element on the transport conveyor as a function of a detected movement profile and a detected time profile of the load current and/or the load voltage, and the movement profile is a path-time-profile and/or a speed-time-profile of movement of the transport element.

16. The transport system according to claim 15, wherein the transport element is adapted to transport at least one container.

17. The transport system according to claim 15, wherein the section is straight and flat, and wherein at least one excitation pattern corresponds to a movement of the transport element at constant speed and/or at least one excitation pattern corresponds to an accelerated movement of the transport element.

18. The transport system according to claim 15, wherein the section is curved in a vertical direction.

19. The method of claim 4, wherein the grey box model is a two-mass model.

20. The method according to claim 5, wherein taking into account the temperature of the dynamic system includes taking into account a temperature of guide and/or bearing elements of the long-stator linear motor and/or of the transport element.

\* \* \* \* \*